March 16, 1937.    V. L. DARNELL    2,074,067
VENTILATED SPLASHPROOF MOTOR HOUSING
Filed Oct. 14, 1935    2 Sheets-Sheet 1

Inventor
Victor L. Darnell
By Walker and DeYoung
Attorney

March 16, 1937. V. L. DARNELL 2,074,067
VENTILATED SPLASHPROOF MOTOR HOUSING
Filed Oct. 14, 1935    2 Sheets-Sheet 2

Inventor
Victor L. Darnell
By Walker and Dybvig
Attorney

Patented Mar. 16, 1937

2,074,067

UNITED STATES PATENT OFFICE 2,074,067

VENTILATED SPLASHPROOF MOTOR HOUSING

Victor L. Darnell, Dayton, Ohio, assignor to The Master Electric Company, Dayton, Ohio, a corporation of Ohio Application October 14, 1935, Serial No. 44,928

13 Claims. (Cl. 172—36)

This invention relates to electric motors and more particularly to a ventilated, splash proof housing therefor adapted to permit a free circulation of air but excluding water, vapors, and dirt when installed in exposed position.

It is quite common practice to provide fan blades or an air impeller upon the rotor or armature shaft of an electric motor which serves to draw air into and discharge it from the motor casing through openings in the motor casing heads.

The present invention provides for such intake of air through the opposite heads of the motor and its discharge peripherally from the medial portion of the casing after having been passed through and about the stator or field element as well as through or about the rotor. The discharge openings are so baffled that while providing free egress for air, entrance of moisture, dirt, vapors and foreign material will be prevented.

The object of the invention is to improve the design and construction of motor casings whereby they may not only be economically manufactured, but in addition to performing the usual functions of supporting and enclosing the motor elements, will be capable of freely passing a relatively large volume of air.

A further object of the invention is to provide a motor casing having protected or baffled air vents which will effectively exclude water and dirt.

A further object of the invention is to provide air circulation passages intermediate the stator or field element and the motor casing through which the air is directed to circumferential vents.

A further object of the invention is to provide vented motor elements and means for effecting circulation of air therethrough.

A further and important object of the invention is to insure uniform distribution of the air currents and thereby equalized cooling effects.

A further object of the invention is to provide a ventilated motor casing which will offer no difficult foundry or manufacturing problems.

A further object of the invention is to provide a baffled or guarded vent opening adapted to exclude moisture and foreign material.

A further object of the invention is to provide an improved ventilator ring which will form a part of a ventilator casing.

A further object of the invention is to provide a ventilating base for a motor casing.

With the above primary and other incidental objects in view, as will more fully appear in the specification, the invention consists of the features of constructions, the parts and combinations thereof, and the mode of operation or their equivalents, as hereinafter described and set forth in the claims.

In the drawings wherein is shown the preferred, but obviously not necessarily the only form of embodiment of the invention, Fig. 1 is a perspective view of an electric motor embodying the present invention.

Figure 6:
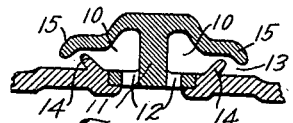
Figure 5:
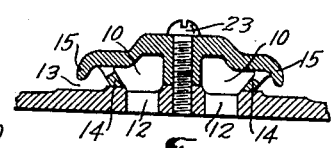
Figure 3:
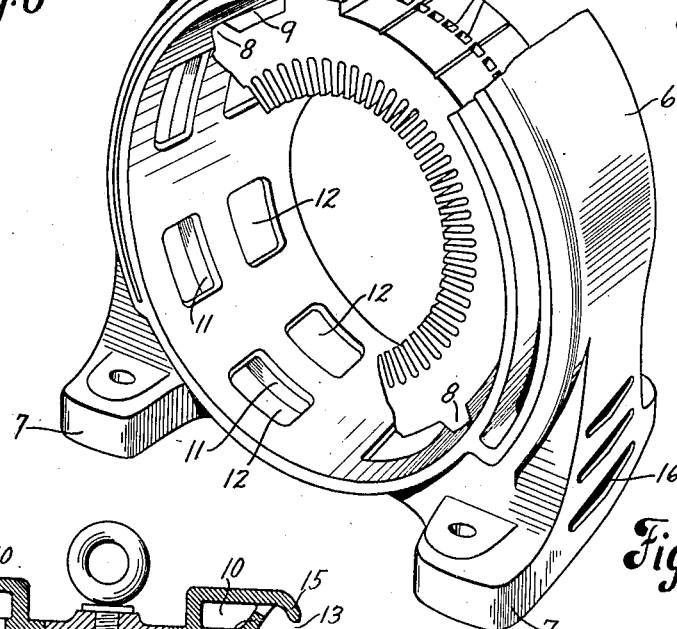
Fig. 3 is a perspective view of a portion of the motor casing and the stator ring therein.
Figure 7:
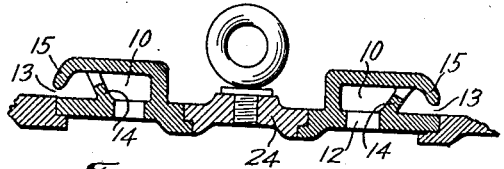
Figure 4:
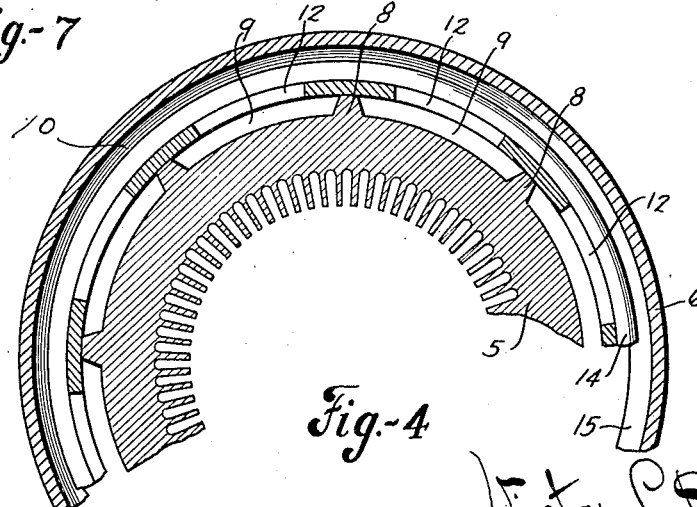
Fig. 4 is a detail transverse sectional view on line 4—4 of Fig. 2.

Figs. 5, 6, and 7 are detail sectional views illustrating modifications of the ventilator ring construction.

Like parts are indicated by similar characters of reference throughout the several views.

While it is quite desirable that electric motors be ventilated and the heat generated during operation dissipated, it is many times necessary to install motors in unfavorable situations where they are subject to splash, drip, spray or vapors of water or other liquids and also to flying particles of grit and dirt which are deleterious to the motor if they enter the housing. Therefore while provision is made for free air circulation the vents are of tortuous form and so arranged that the water or grit particles must follow a difficult and unnatural course in entering the casing through the air vents. The air intake ports are downturned at the bottom of the casing so that moisture and dirt will not be likely to be sucked into the housing.

Figure 1:
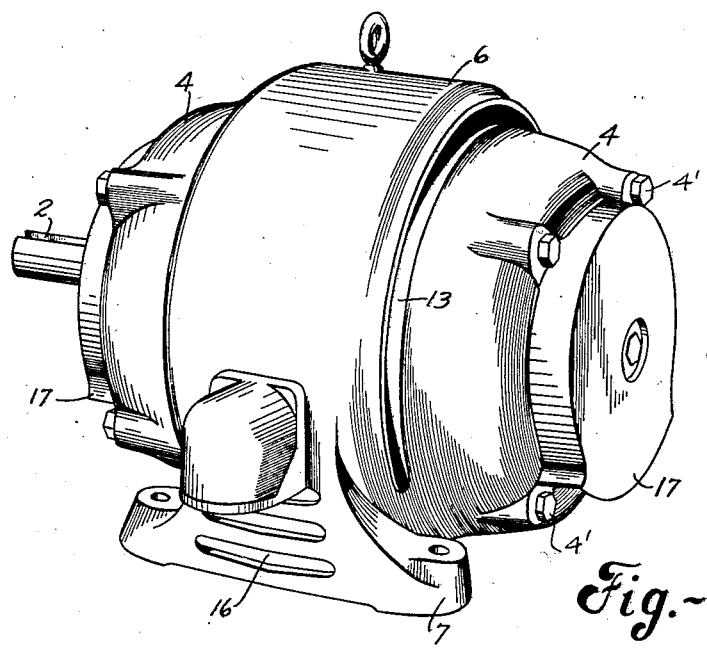
Figure 2:
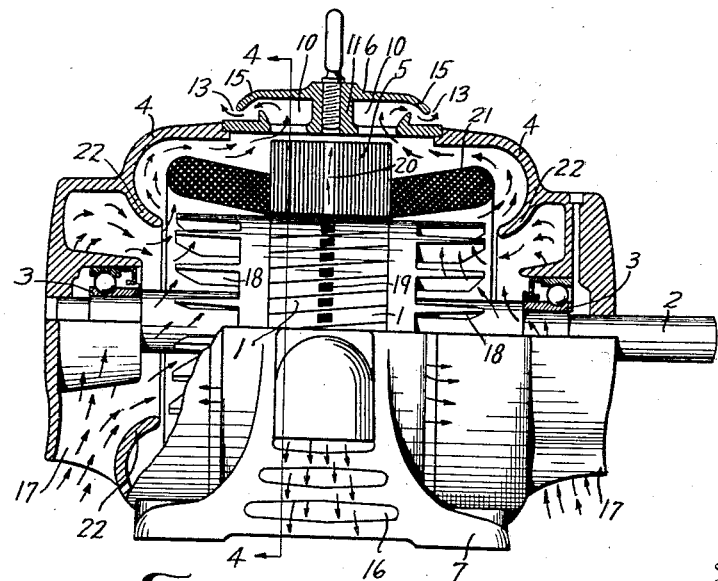
Fig. 2 is a longitudinal sectional view.

Figs. 1 and 2 of the drawings show an assembled squirrel cage type motor of which 1 is the rotor carried upon the shaft 2 mounted in bearings 3 in the oppositely disposed heads 4—4 of the motor casing. Surrounding the rotor 1 is the stator element 5 enclosed in and in turn surrounded by a ventilated casing ring 6 which is extended downwardly and is provided with supporting feet 7 upon which the motor rests. The casing comprising the opposite heads 4 and interposed ventilator ring 6, is held by tie bolts 4'.

The stator ring 5 is provided with a series of spaced peripheral lugs 8—8 which engage the interior of the ventilated casing ring to support the stator in spaced relation therewith and affording therebetween a series of arcuate air passages 9. The ventilator ring 6 is double walled or jacketed thus affording therein a pair of parallel annular passages 10—10 separated by a septum 11 connecting the spaced inner and outer walls of the ring. The inner wall of the ventilator ring 6 is provided with a series of spaced ports 12 affording intercommunication between the arcuate air passages 9 and the annular passages 10 within the casing ring.

The circular passages 10 in the ventilator ring 6 are open at their outer sides throughout substantially three-fourths the circumference of the casing ring. These air exit slots 13 are baffled to afford a tortuous path through which the air may freely pass outwardly but which will obstruct and minimize the entrance of moisture and dirt. The inner wall of the ventilator ring is provided with peripheral flanges 14 at the outer sides of the passages 10 which are overhung in spaced relation by contracted or flanged margins 15 of the outer wall of the casing ring 6. The edges 15 of the contracted outer walls of the ventilator ring extend slightly beyond the flaring flanges 14 of the inner wall affording oppositely directed tortuous exit passages throughout approximately three-fourths the circumference of the motor casing. Throughout the lower portion of the ventilator ring the ports 12 communicate with the hollow interior of the base or supporting portions 7 which are provided with louvers 16 through which air is discharged from the lower portion of the casing.

The opposite casing heads 4 have downturned intake ports 17 through which the air supply is drawn into the motor housing. The rotor 1 is provided at each end with fan or impeller blades 18 which as the rotor revolves draws a continuous stream of air into the motor casing from each end through the intake ports 18. These streams of air are circulated by the impeller blades through the interior of the motor casing and about the motor elements. To facilitate thorough circulation and uniform dissipation of generated heat, the rotor is preferably provided with peripheral ventilating ports 19. The surrounding stator member is also provided with radial passages 20 communicating with the segmental passages 9. The air entering the segmental passages 9 from either side where it passes in close proximity to the windings 21, and also entering through the stator passages 20 is discharged thence through the interior ports 12 into the annular passages 10 from which it escapes through the opposite annular slots 13 and through the base louvers 16. The motor casing heads 4 are provided with interior flanges 22 which direct the incoming air to the impeller vanes and thence about the motor windings.

The construction is susceptible of various modifications to facilitate manufacture. In lieu of forming the vented ring 6 as a single integral piece, the inner and outer walls may be cast or otherwise formed separately and subsequently connected in assembled relation by screws 23 as shown in Fig. 5. Likewise the peripheral flanges 14 may be formed on the adjacent margins of the motor casing heads 4 extended into proximity with each other and a ported ring portion carrying the exterior wall of the ventilator ring may be clamped between the flanged margins as is shown in Fig. 6.

In motors of extremely large size it may be desirable to form the ventilator ring portion in two separate parts each including one passage 10 with a flange 14 and overhanging flange 15 and communicating ports 12, between which ventilator portions a spacer ring 24 is interposed and united therewith by welding, or merely clamped therebetween as is shown in the detail view Fig. 7.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms, or modifications, within the legitimate and valid scope of the appended claims.

Having thus described my invention, I claim:

1. An electric motor casing including oppositely disposed heads having downwardly turned air intake openings, a ventilator ring, interposed between the casing heads, including concentric inner and outer spaced walls and a medial septum connecting the inner and outer walls, a pair of parallel annular passages therein having a series of spaced ports in the inner wall of said ring affording communication between the interior of the casing and said passages and said passages each having a lateral opening exit slot extending peripherally of the motor casing from one side to the other thereof, the margins of the exit slot being offset in spaced overlapping relation, and a hollow supporting portion for the casing with which the passage communicates having air exit openings therefrom.

2. In an electric motor, rotor and stator elements and a casing therefor including opposite head portions having air intake orifices and a ventilator ring portion forming a part of the motor casing interposed between the head portion and surrounding the stator element in relatively spaced concentric relation, spacing means intermediate the stator element and the ventilating ring whereby air passages are provided intermediate the stator and ventilator ring, an annular passage in said ventilator ring, extending peripherally of the motor casing, communicating with the air passages intermediate the ring and stator at relatively spaced points, a laterally directed arcuate slotted exit orifice from the ventilator ring passage to atmosphere, marginal flanges for said exit orifice disposed in offset spaced overlapping relation, and air impeller means actuated by the rotor for drawing air into the housing through the casing heads and discharging it peripherally of the casing through said ventilator ring.

3. In an electric motor casing, a ventilator ring to extend circumferentially of the motor parts, including inner and outer spaced walls, a partition wall medially interconnecting the inner and outer walls with each other said walls being spaced apart at their margins, peripheral outwardly directed flanges on the inner wall, inturned margins on the outer wall overhanging the inner wall flanges in spaced relation and affording therebetween a tortuous passage, said inner wall having openings therein through which the space intermediate the inner and outer walls communicates with the interior of the ring.

4. In an electric motor, a stator ring, a ventilator ring surrounding the stator ring in concentric spaced relation, spacing lugs on the stator ring engaging the interior surface of the ventilating ring and affording intermediate air spaces, a circumferential air passage in said ventilator ring communicating through spaced ports with the air spaces intermediate the stator ring and ventilator ring, said passage having a lateral exit slot therein extending in a circumferential direction through which air may be discharged from the passage and overlapping spaced marginal flanges on said ring defining said exit slot.

5. A casing for an electric motor including oppositely disposed heads, each having a downturned air intake opening, a hollow casing ring interposed between the heads including interconnected inner and outer spaced concentric walls, an annular air passage intermediate the inner and outer walls of said ring communicating with the interior of the casing at spaced intervals through relatively spaced openings in the inner wall of said ring, and having a laterally directed exit slot extending circumferentially of the casing and marginal spaced overlapping flanges on the inner and outer walls of said ring defining said exit slot.

6. A casing for electric motors including oppositely disposed heads, at least one of which is provided with an air intake opening, and a hollow casing ring interposed in a medial plane between the heads including inner and outer concentric walls, a medial partition wall interconnecting the inner and outer wall and a pair of parallel annular air passages within said ring communicating with the interior of the casing through an opening in the inner wall of said ring each having an air exit slot extending circumferentially of the casing.

7. A casing for electric motors including oppositely disposed heads, at least one of which is provided with an air intake opening, a hollow casing ring interposed between the heads including inner and outer relatively spaced concentric walls, an annular passage communicating with the interior of the casing through an opening in the inner wall of said ring and having a lateral exit slot extending circumferentially of the casing, and a pair of overlapping relatively spaced flanges upon the inner and outer walls respectively defining the exit slot and forming a tortuous path for air from said passage.

8. A casing for an electric motor including oppositely disposed heads at least one of which has an air intake opening, a hollow casing ring interposed between the heads including inner and outer relatively spaced concentric walls, the margins of which are disposed in offset overlapping relation to afford therebetween a continuous exit slot, an annular air passage therein communicating with the interior of the casing through an opening in the inner wall of the ring, a hollow supporting portion communicating with said passage upon which the motor casing rests and having exit openings therein for discharge of air from said passage.

9. A casing for an electric motor of a generally cylindrical form including closure heads at its ends, a downwardly opening air intake passage leading to the interior of the casing, said casing having a continuous circumferential slotted exit opening intermediate its ends through which air entering the casing through said passage is discharged peripherally therefrom and baffle means associated with the exit opening directing the air through a tortuous path to the exit opening.

10. A ventilator ring for a motor casing to be disposed peripherally about the motor parts in a plane substantially midway between the ends thereof, comprising inner and outer concentric spaced annular walls, the margins of which are disposed in laterally offset overlapping spaced relation affording therebetween exit openings, a septum medially connecting the walls and dividing the space therebetween into parallel passages, and a series of spaced ports in the inner wall communicating with the passages through which air is admitted from the interior of the motor casing into said passages for discharge laterally therefrom between the overlapping spaced margins of the annular walls.

11. A ventilating ring for a motor casing to be disposed peripherally about the motor parts in a plane substantially midway between the ends thereof including an inner wall and an outer wall disposed in concentric spaced relation, an intermediate passage therebetween, said inner and outer walls being interconnected one to the other at one side of the air passage and marginally separated one from the other at the opposite side of the passage, an out turned circumferential flange on the inner wall at the outer side of said passage, and an inturned flange upon the outer wall spaced outwardly beyond the flange upon the inner wall to afford therebetween a tortuous lateral outlet for air from said passage.

12. The combination with an electric motor including a stator ring of a ventilating ring surrounding the stator ring in the plane thereof including an inner wall and an outer wall interconnected with each other in concentrically disposed spaced relation, an air passage therebetween having a lateral outlet opening, a series of ports in the inner wall opening into said passage, and a series of integral spaced lugs upon the periphery of the stator ring engaging the inner wall of the ventilating ring to maintain the ventilating ring and stator ring in concentric spaced relation and afford an air space therebetween communicating with the air passage in the ventilating ring.

13. The combination with an electric motor including a stator ring of a ventilating ring surrounding the stator ring, spacer lugs carried by one of the said rings and engaging an adjacent face of the other ring to maintain the rings in concentric spaced relation, whereby an air space is afforded therebetween, an air passage in the ventilator ring having a lateral air discharge opening, and ports in the inner wall of the ventilating ring intermediate the spacer lugs affording intercommunication between the air space between the rings and the passage in the ventilating ring.

VICTOR L. DARNELL.